March 29, 1938.  F. W. POOLEY  2,112,607
LEVER MECHANISM
Filed Sept. 12, 1935    2 Sheets-Sheet 1
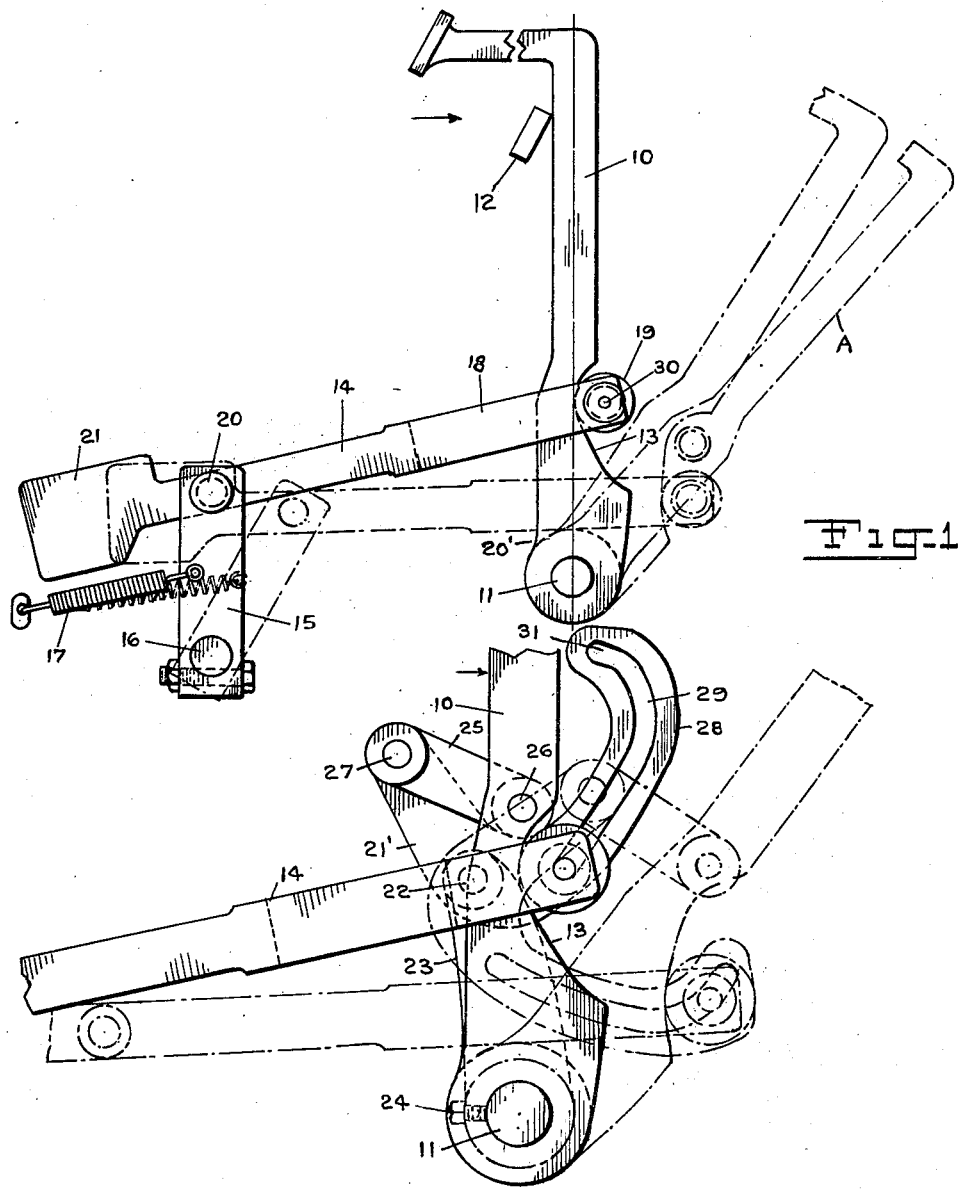
INVENTOR.
Frederick W. Pooley
BY Arthur H. Serrell
his ATTORNEY.

March 29, 1938.　　　F. W. POOLEY　　　2,112,607

LEVER MECHANISM

Filed Sept. 12, 1935　　　2 Sheets-Sheet 2

INVENTOR.
Frederick W. Pooley.
BY Arthur H. Serrell
his ATTORNEY.

UNITED STATES PATENT OFFICE 2,112,607

LEVER MECHANISM

Frederick W. Pooley, Brooklyn, N. Y.

Application September 12, 1935, Serial No. 40,203

3 Claims. (Cl. 74—516)

My present invention relates in general to a lever mechanism, particularly adapted for use in controlling the operation of a braking system, or clutch releasing device, as utilized in connection with automobiles and similar contrivances, and it more specifically concerns a mechanism of this type preferably operated from a pedal lever such as is customarily employed in such devices for accomplishing the mechanical functions stated.

The primary object of the invention is to employ a lever mechanism in association with either the brake or clutch movement controlling means of an automobile which will enable the operator of the same to obtain the mechanical advantage of an increasing leverage ratio when applying the pedal so that the physical effort required is considerably decreased.

A further object and advantage accomplished by the present inventive disclosure is to attain the first named object without the necessity of materially increasing the pedal or lever swinging movement of the primary lever. The distance of operation of this element in the present mechanism is actually shortened so that the same mechanical movement at either the brake, or clutch, can be obtained by the operator without moving the lever through as long an arcuate distance.

Another object of the invention is to provide a mechanism of this type in which there is a connecting rod member having a freely movable end adapted to move along a cam surface located on the primary lever, or pedal, of the device. A still further object is to construct a mechanism so that the freely movable end of the connecting rod of the device will be secured against undesired motion, or vibration, either at an inoperative position or in any position that the same may take during the manual operation of the mechanism.

The invention also contemplates the employment of a counterweighted connecting rod for the improved mechanism.

My invention, also, includes other objects, advantages and novel features of construction and arrangement hereinafter more particularly referred to in connection with the detailed description of the drawings showing the preferred mechanical embodiment of the same.

Referring to the drawings:

Fig. 1 is a diagrammatic side elevation of the mechanism showing the embodiment of the same employed with automobile braking systems.

Fig. 2 is an enlarged detail side elevation of the mechanism illustrating the pivotal arrangement for securing the free end of the connecting rod against undesired movement.

Figure 3:
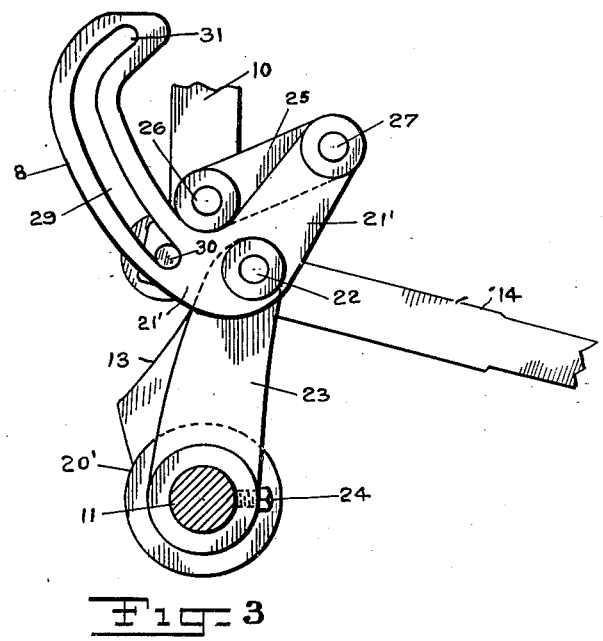
Fig. 3 is a detail side elevation of the mechanism as shown in Fig. 2 from the opposite side of the same.

With particular reference to Fig. 1 of the drawings, the lever mechanism embodying the present inventive concepts is constructed to include a primary or pedal lever 10, which is pivotally mounted on a shaft 11 that is secured in a fixed position on the chassis of an automobile, or in some other desired manner. A stop 12, which may be formed by the floor boards of the automobile provides a limit for the upward or released extension of the lever 10. It will be understood that while I have shown a lever having a foot pedal such as customarily employed in this regard, the same is not to be considered as limited to this structure, but may include other primary levers such as may be operated by hand, hydraulically controlled, or otherwise manipulated. The forward lower portion of the primary lever 10 is constructed in the form of a cam, as designated at 13 in the drawings, the arcuate or curved surface of which starts substantially from the position of a longitudinal center line along the lever and extends forwardly and downwardly therefrom to a position in advance of the center line and near the fixed pivot axis for the lever as determined by the shaft 11.

Lever 10 is connected through means of a rod 14 to a secondary pivotally positioned lever 15 that is mounted on a suitably located shaft 16, the movement of which controls the operation of the brake mechanism of the automobile in the customary manner. A return motion spring 17 is provided in association with lever 15 to return the brake operating lever mechanism to a released or inoperative position after the manual application of the mechanism through pedal 10 is finished.

One end of the connecting rod 14 is bifurcated as indicated at 18, the forks or arms of the same extending beyond and to the opposite sides of the pedal member 10. A roller 19 is located between the tips of the bifurcated portion 18 of the rod 14 so that the same assumes a position against the cam surface 13 of the lever 10. The other end of the rod 14 is pivotally connected to lever 15 as designated at 20, the same having a counterweighted extension 21 therefrom which balances the rod 14 about its pivotal axis. By reason of this construction, additional retracting spring effort for returning the mechanism to an inoperative position is avoided. Because of the counterweight 21, the roller 19 of the rod 14 takes any position along the cam surface 13 of the lever 10 conforming with the degree of forward movement that the operator has given to the pedal. The end of the connecting rod containing the roller 19 is free to move along the cam surface 13 of the lever and the same is actuated during the application of the brakes by the operator in a forwardly and downwardly direction to take the position shown by the dotted lines in the drawings. During this operation, the leverage ratio, through which the force along rod 14 is transmitted to the lever 15, increases as the forward movement of the pedal progresses, the rod 14 approaching the pivot axis 11 thereby affording the operator considerable mechanical advantage and diminishing the physical effort required. The maximum limit of travel of the rod 14 towards the stationary axis of the lever 10 is attained when the undersurface of the rod contacts the flanged portion of the lever designated in the drawings in 20'. However, this does not limit the forward movement of travel of the lever 10, the rod 14 remaining in position against the flanged portion 20' of the lever and being drawn forward over the same by the additional forward motion given it by the operator. The roller 19, in such an instance, being estopped from further downward motion, moves upwardly along the cam surface 13 under influence of the advancing lever 10. The mechanism is designed in a manner that, under normal circumstances, a partial degree of movement of the pedal lever 10 is sufficient to accomplish a complete braking application before the same actuates the rod 14 to the point of its maximum limit of travel.

The advantage of increasing the leverage ratio, as the mechanism is applied, in order to minimize the operating effort, is obtained by reason of the structural provisions of the movable roller connecting rod in its relation to the primary lever. The pedal movement needed by the operator in applying the brake is furthermore decreased due to the advancing action of the roller as it passes over the curved cam away from the longitudinal center line of the primary lever. In order to clearly demonstrate this feature of the mechanism, as shown, the position that a pedal lever, having a fixed pivotal connecting rod at the same initial leverage ratio as the present device, would have to advance to, in order to obtain the same movement of the brake shaft 16, is designated at A in Fig. 1. This position, it will be particularly noted, requires the operator to move the lever 10 through a longer arcuate distance to accomplish the same braking effort than is necessary in the improved mechanism.

With reference to Figs. 2 and 3, the aforesaid lever mechanism is shown in accompaniment with a control mechanism forming a part thereof, the function of which is to movably secure the free end of the connecting rod 14 against undesired motion along the cam surface 13 during the operation of the automobile. This mechanism consists of a bell crank 21' pivotally mounted on a shaft 22 located on the upper portion of an extension piece 23 firmly held in position upon the shaft 11 by means of a screw 24 or otherwise similarly located. One end of the bell crank lever 21' is connected to the primary lever 10 by means of a link 25, the pivotal connections to the respectively joined members being designated at 26 and 27. The opposite portion of the bell crank lever 21' is constructed in the form of a plate 28 which has a forwardly extending curved slot 29 in the same.

The shaft on which the roller member 19 of the mechanism is mounted in position across the end of the bifurcated portion of the connecting rod 14 is designated in the drawings at 30. One end of this shaft extends laterally therefrom through the arm of the bifurcated rod adjacent to the controlling mechanism and fits within the slot 29 in the bell crank 21'. During application of the brake, the mechanism functions as heretofore described, the forward motion of the pedal 10 actuating the bell crank, so that the slotted plate 28 moves to accommodate the change in position of the roller 19 on the cam surface 13, the position of the shaft 30 within the slot 29 preventing the free end of the connecting rod of the mechanism from assuming any other position due to vibration or shock, than the position that the same would take under the positive control of the operator at the pedal lever. Slot 29 is formed to include an abrupt upwardly curved portion as designated at 31, which facilitates the further movement of the pedal lever 10 after the connecting rod 14 has been urged to a maximum limiting position against the flange 20'.

Figure 4:
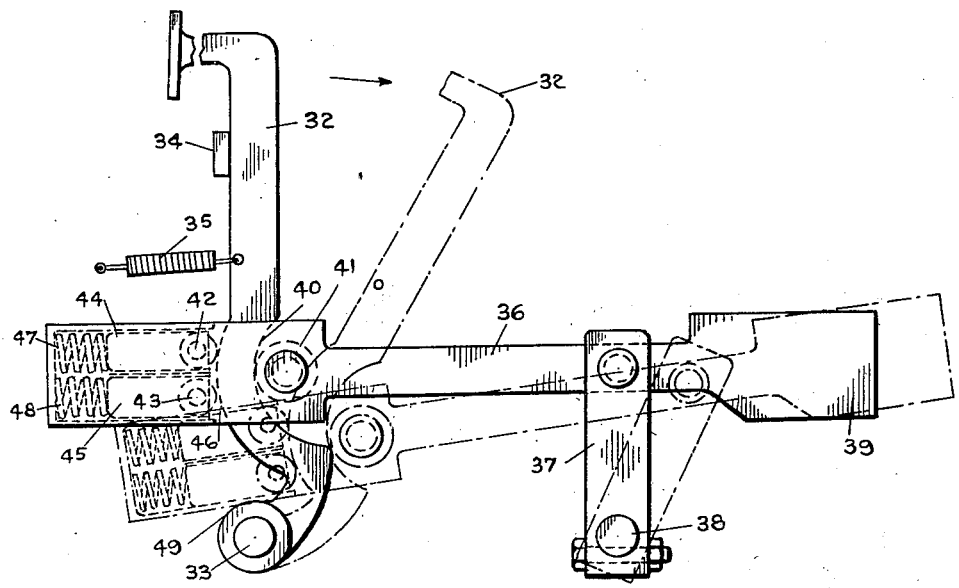
Fig. 4 is a side elevation of a modification of the invention illustrating the form of the same preferably adapted for use as a clutch releasing device.

Referring to Fig. 4 of the drawings, the modification of the invention, as applicable for use in connection with a clutch mechanism, is constructed to include a pedal lever 32 pivotally mounted on a fixed shaft 33. The limiting stop and return spring in this form of the invention are designated in the drawings at 34 and 35 respectively. The bifurcated connecting rod is indicated at 36 the same being pivotally connected to a lever 37 mounted for movement on a fixed shaft 38 through which the motion of the pedal is transferred to the clutch of the automobile in the customary manner. The counterweight for the connecting rod is indicated at 39 in this instance. The lower portion of the pedal lever 32 is curved to form a cam surface 40, along which a roller 41, secured between the arms of the bifurcated portion of the rod 36, moves in a forward and downward direction as the mechanism is operated by movement of the pedal. Furthermore, in this embodiment of the invention, I provide means for controlling the free end of the rod 36 against undesired movement in the form of rollers 42 and 43 contained by holding members 44 and 45 within the extending portion of the bifurcated rod. These rollers are pressed against a cam surface 46 on the primary lever 32, at the opposite side of the lever to the cam surface 40, by means of springs 47 and 48 respectively. As in the previously described form of the invention, the counterweight normally balances the rod 36 about its pivotal connection to lever 37. The maximum limit of travel of the rod 36 towards the fixed shaft 33 is defined by the flange 49 on the lever 32, further forward motion of the primary lever being afforded the mechanism in a similar manner as that hereinbefore described.

Inasmuch as the inventive concepts herein disclosed may be embodied in other desired forms, various modifications of the illustrated improvements may occur to those skilled in the art and may be made without departing from the scope and purview of the invention, as claimed.

I claim as my invention:

1. A mechanism of the class described comprising a primary lever having a cam surface thereon, a secondary lever, a connecting rod therebetween, said rod having an unsecured movably mounted end adapted to engage the cam surface of the primary lever, and means for retaining the unsecured end of the rod from undesired motion throughout the distance of its travel along the cam surface of the primary lever.

2. A mechanism of the class described comprising two levers, a connecting rod between said levers, said rod being pivotally joined to one of the same and freely engaged against the other, and a pivotally mounted bell crank mechanism linked to the lever associated with the freely engaged end of the rod providing means for retaining the same from undesired motion.

3. A mechanism of the class described comprising a primary lever, a secondary lever, a connecting rod therebetween, said rod being pivotally joined to the secondary lever, means for movably engaging said rod and primary lever whereby their point of joinder is adapted to freely approach the pivotal axis of the primary lever through the sole influence of the movement of the lever during operation, a pivotally mounted bell crank mechanism linked to the primary lever, said bell crank mechanism including a slotted plate in which a lateral extension from the movably engaged end of the connecting rod is positioned to retain the same from undesired motion throughout the operation of the primary lever.

FREDERICK W. POOLEY.